July 6, 1937.  T. BROWN  2,086,350
CONTROL MECHANISM
Filed Sept. 12, 1936  3 Sheets-Sheet 1

INVENTOR
THEOPHILUS BROWN
BY
ATTORNEYS

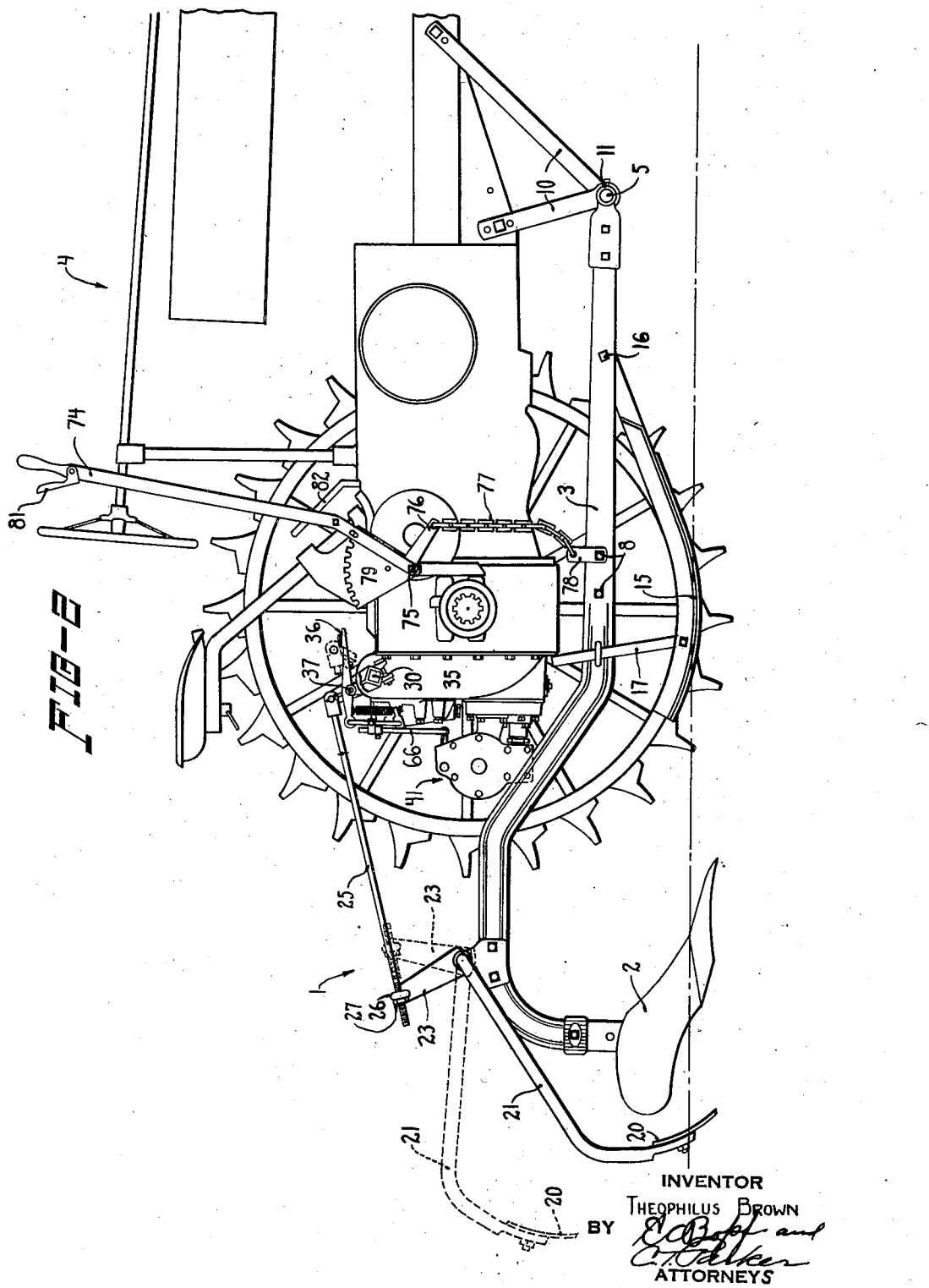

July 6, 1937.  T. BROWN  2,086,350
CONTROL MECHANISM
Filed Sept. 12, 1936   3 Sheets-Sheet 3
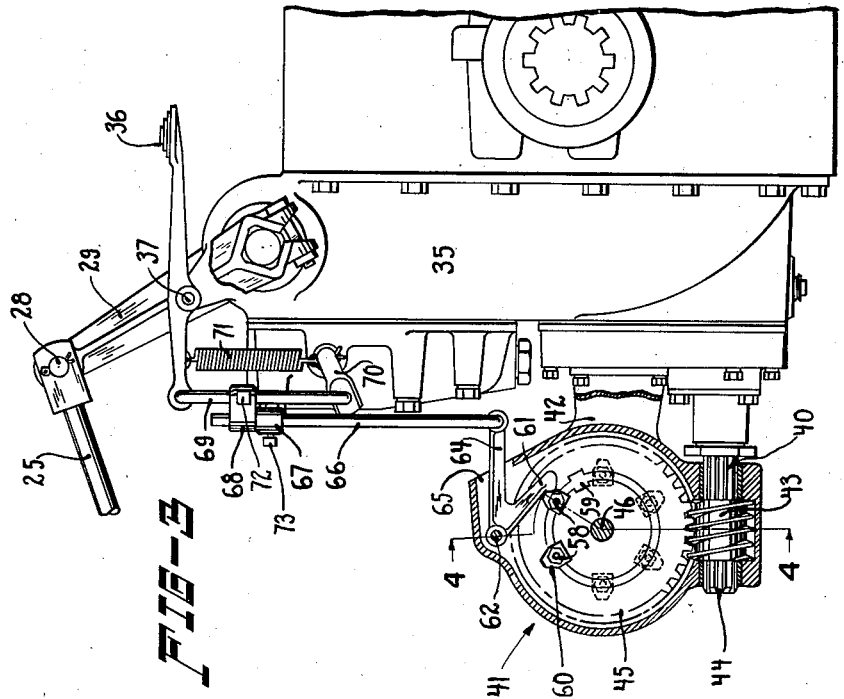
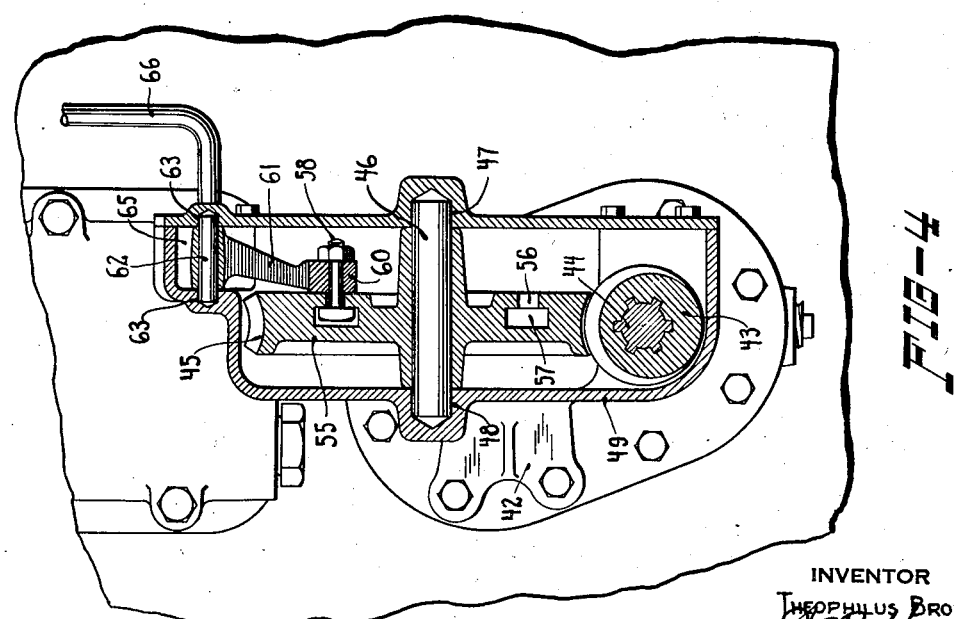
INVENTOR
THEOPHILUS BROWN
BY
ATTORNEYS Patented July 6, 1937

2,086,350

UNITED STATES PATENT OFFICE 2,086,350

CONTROL MECHANISM

Theophilus Brown, Moline, Ill., assignor to Deere & Company, Moline, Ill., a corporation of Illinois Application September 12, 1936, Serial No. 100,516

12 Claims. (Cl. 97—55)

The present invention relates generally to control mechanisms and more particularly to mechanism for periodically actuating the control lever of a power lift device on a tractor for the purpose of raising and lowering at predetermined intervals an implement connected to the power lift device and drawn by the tractor.

The embodiment of my invention, which is disclosed herein, comprises a damming scraper used in connection with a lister. In certain territories in which farming is done by irrigation, or in which rainfall is infrequent, it has been found desirable to place small dams across the furrows in order to prevent water from quickly draining off the field. These dams are usually formed during the listing operation by drawing a spade-like tool along the furrow directly behind the lister. This tool is so positioned that it lightly scrapes the sides of the furrow and so gradually accumulates a pile of dirt, the scraper being raised at intervals to deposit the pile of dirt in the furrow to form a dam.

The principal object of my invention is to provide means for timing the frequency of operation of the power lift device for raising and lowering an implement, using a predetermined number of revolutions of the engine as a measure. Inasmuch as the distance traveled by the tractor is also proportional to the number of revolutions of the engine, the dams are thus located at substantially equal intervals.

A further object is to use the existing power take-off shaft for operating the timing device.

Still another object is to provide means for adjusting the intervals between operations in order to vary the spacing between dams, since it is desirable to space the dams closer together when the furrows are steeply inclined than in more level furrows.

Other objects will be made apparent to those skilled in the art by a consideration of the following description and explanation in which reference is made to the drawings which are appended to and forming a part of this application.

In the drawings—

Figure 2 is an elevation of the embodiment of Figure 1, but with the right wheel removed;

Figure 3 is an elevation, partly in section, of the timing device and the method of attaching it to the power lift control mechanism and to the power take-off shaft; and Figure 4 is a sectional end view of the timing mechanism taken along the line 4—4 of Figure 3.

Figure 1:
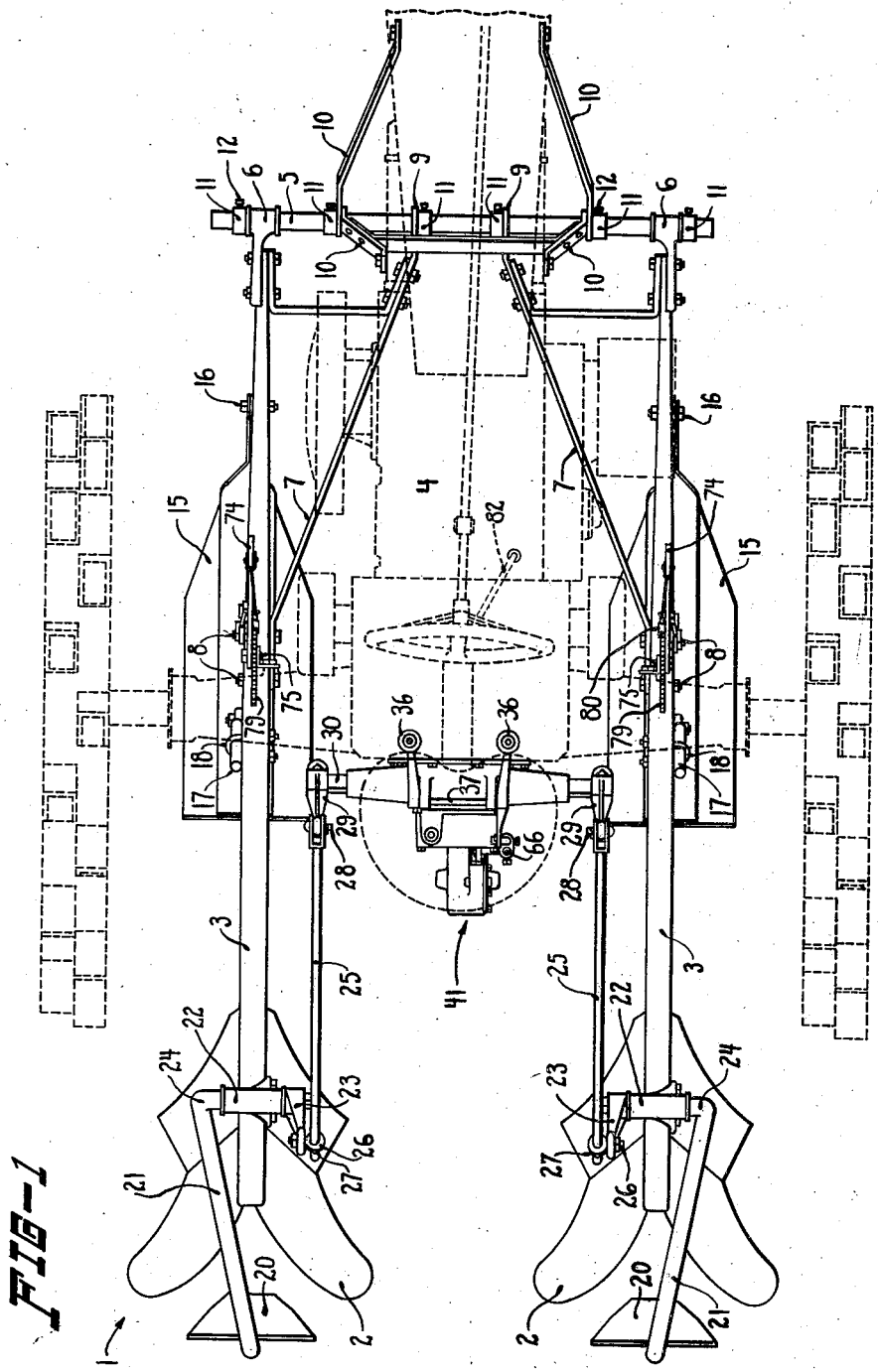
Figure 1 is a plan view showing a lister with a damming attachment and a control device embodying the principles of the present invention, and connected to the power take-off shaft of the tractor.

Referring now to the drawings, more particularly to Figures 1 and 2, the implement designated generally by the reference numeral 1 comprises a pair of lister bottoms 2 mounted on beams 3, which extend under the tractor 4 longitudinally of the line of advance, and are pivotally connected to a transversely extending shaft 5 by means of journals 6. Diagonal braces 7 are fastened to the beams 3 by bolts 8, their forward ends 9 being pivotally mounted on the shaft 5. The shaft 5 is supported beneath the tractor 4 by means of supports 10, the shaft 5 being slidable within the apertures in the lower ends of the supports 10. Proper spacing between the bearings 6, the braces 7 and the supports 10 is maintained by collars 11 which are fixed to the shaft 5 by set screws 12.

Depth gauging runners 15 are pivoted by bolts 16 to the beams 3 and extend rearwardly therefrom, the height of the beams 3 above the ground being determined by vertical rods 17 pivoted to the runners 15 and clamped to the beams 3 by U-bolts 18. Thus the beams 3 may be pivoted around the shaft 5 to obtain the proper depth of furrow, the depth being maintained by tightening the clamps 18 so that the beams 3 are held at a fixed distance from the runners 15.

Immediately behind each of the lister bottoms 2 is a damming scraper 20 having a spade-like tool which is adapted to conform to the sides of the furrow and lightly engage the sides of the furrow to gradually accumulate dirt as the implement advances, so that by the time the implement has advanced over a predetermined interval, enough dirt has accumulated to form a dam at which time the scrapers 20 are raised to deposit the dirt in the furrow. Each of the scrapers is supported on an upwardly and forwardly extending arm 21, the upper end of which is bent to be inserted into a journal 22, which is supported transversely on the beam 3. A lever arm 23 is fixedly attached to the end of the transversely extending end 24 of the beam 21.

An operating rod 25 is inserted through an eye-bolt 26 at the end of the arm 23 and is secured therein by a nut 27 engaging the threaded end of the rod. Adjustment of this nut 27 on the rod 25 determines the depth in the furrow at which the damming scraper 20 operates. The operating rods 25 extend forwardly to pivot joints 28 by which they are rigidly attached to the power lift shaft 30 at opposite ends, respectively.

The power lift shaft is operated by suitable mechanism within a housing 35 and is controlled by a pair of foot pedals 36, which are fixed to a common pivot shaft 37. The mechanism for operating the power lift shaft 30 does not form a part of the present invention, as any suitable mechanism may be employed. The preferred power lift mechanism is disclosed in a copending application, Serial No. 749,706, filed October 24, 1934, by McCormick, Stewart and Worthington, whereby the power lift shaft 30 is rotated clockwise as shown in Figure 2 when the control pedal 36 is actuated and released, and upon a second actuation and release of the control pedal the power lift shaft 30 returns to its normal position. In Figure 2 the raised position of the damming device 20 is shown by dotted lines.

Referring now more particularly to Figures 3 and 4, the power take-off shaft 40 projects rearwardly from the tractor beneath the power lift mechanism to which is operatively connected the timing device 41 supported on a bracket 42 from the rear of the housing 35. The timing device comprises a worm 43 which is adapted to slip over the splined end 44 of the power take-off shaft 40, and a worm gear 45 which meshes with the worm 43 and is journaled on a shaft 46, which is supported in recesses 47, 48 in a gear housing 49. Gear 45 has a web portion 55 within which is formed a circular groove 56 which is coaxial with the gear 45 and has an enlarged inner portion 57 adapted to receive the heads of bolts 58 which may be inserted through a hole 59. On each of the bolts is supported a cam 60. Hence by sliding the bolts 58 around the groove 56, the cams may be positioned in any desired arrangement as will be explained later. A cam follower 61 is journaled on a shaft 62, which is supported in recesses 63 in the housing 49. The follower 61 engages the cam 60 and has a lever 64 which extends forwardly out of the housing through an opening 65. An operating rod 66 is pivoted to the end of the lever 64 and extends upwardly through a guide bearing in a member 68. The latter member is adjustably fixed to a connecting rod 69 by a set screw 72. The connecting rod 69 connects the foot pedal 36 with an operating lever 70 of the power lift device. A stop 67 is fastened to the operating rod 66 by a set screw 73, and is adapted to engage the member 68 to lift the connecting rod 69 to actuate the operating lever 70 of the power lift.

Hence as the power take-off shaft 40 revolves, the worm 43 slowly rotates the worm gear 45 in a clockwise direction, as viewed in Fig. 3. As each of the cams 60 passes the cam follower 61, the latter is momentarily raised, thereby rotating the lever 64 around the axis of the shaft 62, causing the rod 66 to be raised so that the stop 67 engages the member 68 to raise the connecting rod 69. The stop 67 can be adjusted along the rod 66 to coordinate the extent of movement of the rod 66 to the required movement of the connecting rod 69. The foot pedal 36 can be actuated independent of the timing device thereby sliding the member 68 upwardly on the rod 66 away from the stop 67. The preferred power lift mechanism as described in the aforementioned application is of the hydraulic type and is adapted to be raised by one actuation of the control pedal 36, in which position it remains until the control pedal 36 is actuated a second time. After each actuation of the pedal it is returned to its normal position by a coil spring 71 which also serves to lower the cam follower 61 to a position where it can engage the next cam 60. Hence two cams 60 are required for each complete raising and lowering cycle. By adjusting the number and the relative positions of the cams on the worm gear 45, the timing of the raising and lowering operations of the power lift device may be adjusted. Thus the interval between two raising operations is determined by a predetermined number of revolutions of the power take-off shaft 40, but as the distance over which the tractor travels in this time is also proportional to the number of revolutions of the power take-off shaft, the distance between the dams formed in the furrows by the damming device 29 can be accurately predetermined.

The beams 3 can be independently raised from earth-engaging position by means of hand levers 74, pivotally connected to the tractor at each side thereof, respectively, by bolts 75. At the lower end of each lever 75 is an arm 76 extending therefrom, the arm being connected by a chain 77 and a link 78 to the respective beam 3. A notched quadrant 79 fixed to the tractor is engaged by a latch 80 operated by a handle 81 on each lever 74 for holding the beam at any desired elevation.

The power take-off shaft can be declutched by a hand lever 82 in a manner known to the art.

I do not intend my invention to be limited to the particular details shown and described herein, nor do I intend that it be limited to a furrow damming device, as periodic raising and lowering of other implements by the power lift device may be timed by a device of this kind.

What I desire to protect by Letters Patent is set forth in the following claims.

I claim:

1. In combination with a tractor having a power take-off shaft and a power lift device including control means therefor, means actuated by said power take-off shaft for periodically energizing said control means to operate said device.

2. In combination with a tractor having an engine-driven shaft and an auxiliary device including control means therefor, timing means actuated by said shaft, for periodically energizing said control means to operate said auxiliary device.

3. In combination with a tractor having a power lift device, control means therefor, and a shaft, the speed of rotation of said shaft being proportional to the speed of advance of said tractor, means actuated by said shaft for periodically actuating said power lift control means.

4. In combination with a tractor having an engine-driven shaft and a power lift device including control means therefor, timing means actuated by said shaft for periodically energizing said control means to operate said device, said timing means including means for adjustably setting the intervals between operations.

5. In combination with a tractor having an engine-driven shaft and a power lift device including control means therefor, means responsive to a predetermined number of revolutions of said shaft, for periodically actuating said control means to operate said device.

6. In combination with a tractor having an engine-driven shaft and a power lift device including control means therefor, means responsive to a predetermined number of revolutions of said shaft, for periodically actuating said control means, said actuating means having adjusting means for changing the number of revolutions of said shaft that determine the periods of operation.

7. Apparatus for periodically actuating the control device of the power lift mechanism on a tractor having a power take-off shaft, said apparatus comprising a train of gears adapted for connection to said power take-off shaft, a cam connected to said gear train and adapted for rotation thereby, a cam follower cooperable with said cam, and means for operatively connecting said follower to said control device.

8. Apparatus for periodically actuating the control device of the power lift mechanism on a tractor having a power take-off shaft, said apparatus comprising a plurality of cams mounted for rotation about a common axis, said cams being peripherally adjustable about said axis, a gear train connected to drive said cams, a cam follower cooperable with said cams and means for operatively connecting said follower to said control device.

9. Apparatus for periodically actuating the control device of the power lift mechanism on a tractor having a power take-off shaft, said apparatus comprising a disc, a plurality of cams adjustably secured thereto, a worm gear for rotating said disc, a worm removably secured to said power take-off shaft, a cam follower cooperable with said cams, and means for operatively connecting said follower to said control device.

10. In combination with a tractor having an engine-driven shaft and a power lift device including control means therefor, an agricultural implement propelled by said tractor and operatively connected to said power lift device whereby an actuation of said implement can be effected by said device, timing means actuated by said shaft for energizing said control means at predetermined intervals, for operating said device to actuate said implement.

11. In combination with a tractor having a power take-off shaft and a power lift device including control means therefor, an earth-engaging tool propelled by said tractor for forming a furrow, a damming device disposed to follow in said furrow, means for connecting said damming device to said power lift device whereby said damming device can be lifted out of the furrow by said power lift device, and means connected to said power take-off shaft, for periodically energizing said control means to operate said power lift device.

12. In combination with a tractor having an engine-driven shaft and a power lift device including control means therefor, a furrow-forming earth-engaging tool and a damming scraper adapted to follow said tool in said furrow, said tool and said scraper being connected to said tractor for propulsion thereby, means for connecting said scraper to said power lift device whereby said scraper can be lifted out of the furrow by the power lift device, timing means actuated by said shaft and connected to said control means, for periodically operating said control means at intervals determined by predetermined integrated numbers of revolutions of said shaft, and means for changing the predetermined numbers of revolutions that determine the periods of operation.

THEOPHILUS BROWN.